United States Patent
Williams et al.

(10) Patent No.: US 9,659,261 B2
(45) Date of Patent: May 23, 2017

(54) USER INTERFACE FOR PORTABLE DEVICE

(71) Applicant: GreatCall, Inc., San Diego, CA (US)

(72) Inventors: Dean Williams, San Diego, CA (US); Kotaro Matsuo, San Diego, CA (US); John Salisbury, San Diego, CA (US)

(73) Assignee: GREATCALL, INC., San Diego, CA (US)

( * ) Notice: Subject to any disclaimer, the term of this patent is extended or adjusted under 35 U.S.C. 154(b) by 268 days.

(21) Appl. No.: 14/067,738

(22) Filed: Oct. 30, 2013

(65) Prior Publication Data

US 2015/0121289 A1    Apr. 30, 2015

(51) Int. Cl.
G06F 3/048    (2013.01)
G06Q 10/00    (2012.01)
G06F 3/0482   (2013.01)

(52) U.S. Cl.
CPC .......... *G06Q 10/00* (2013.01); *G06F 3/0482* (2013.01)

(58) Field of Classification Search
USPC ........................................ 715/776, 777, 778
See application file for complete search history.

(56) References Cited

U.S. PATENT DOCUMENTS

| | | | |
|---|---|---|---|
| 7,479,949 B2 * | 1/2009 | Jobs et al. | ................ 345/173 |
| D604,305 S | 11/2009 | Anzures et al. | |
| D624,556 S | 9/2010 | Chaudri et al. | |
| D643,437 S | 8/2011 | Chaudri et al. | |
| D647,104 S | 10/2011 | Steele et al. | |
| D649,155 S | 11/2011 | van Os et al. | |
| 8,412,845 B2 * | 4/2013 | Katis et al. | ................ 709/234 |
| D681,660 S | 5/2013 | Matas et al. | |
| D701,229 S | 3/2014 | Lee et al. | |
| D710,371 S | 8/2014 | van Os et al. | |
| D720,762 S | 1/2015 | Seo et al. | |
| D720,766 S | 1/2015 | Mandal et al. | |

(Continued)

OTHER PUBLICATIONS

Velazco, Chris, "The Doro PhoneEasy 740: Finally, An Android Phone For Your Grandparents." Mobile World Congress 2012 Feb. 29, 2012: 5 pages. Retrieved from http://techcrunch.com/2012/02/29/the-doro-phoneeasy-740-finally-an-android-phone-for-your-grandparents/ on Oct. 29, 2013.

(Continued)

*Primary Examiner* — Thanh Vu
(74) *Attorney, Agent, or Firm* — Kilpatrick Townsend & Stockton LLP

(57) ABSTRACT

A user interface for a portable electronic device. In an example implementation, a first screen presents selections for launching applications executable by the portable device, the selections being presented in a plurality of horizontal screen regions, and a second screen presents selections related to stored contacts, these selections also being presented in a plurality of horizontal screen regions. Each of the first and second screens is accessible from the other by actuating a respective tab. A selection on the first screen may include an icon representing an application, and a textual description of the application, and the textual description may be prominent in relation to the icon. Actuating a selection on the second screen may access an individual contact screen that presents a chronological history of communications with the corresponding contact.

22 Claims, 7 Drawing Sheets

(56) References Cited

U.S. PATENT DOCUMENTS

| | | | |
|---|---|---|---|
| D724,603 S | 3/2015 | Williams et al. | |
| D727,931 S | 4/2015 | Kim et al. | |
| D735,737 S | 8/2015 | Lee et al. | |
| D736,238 S | 8/2015 | Kim et al. | |
| D739,864 S | 9/2015 | Kang et al. | |
| D741,901 S | 10/2015 | Gardner et al. | |
| 2004/0100479 A1* | 5/2004 | Nakano et al. | 345/700 |
| 2006/0150125 A1* | 7/2006 | Gupta et al. | 715/864 |
| 2008/0163112 A1* | 7/2008 | Lee | G06F 3/0482 715/810 |
| 2008/0261569 A1* | 10/2008 | Britt et al. | 455/414.1 |
| 2009/0089676 A1* | 4/2009 | Finkelstein et al. | 715/719 |
| 2009/0144661 A1 | 6/2009 | Nakajima et al. | |
| 2010/0081475 A1* | 4/2010 | Chiang | G06F 3/0483 455/564 |
| 2011/0202879 A1* | 8/2011 | Stovicek et al. | 715/828 |
| 2011/0273379 A1* | 11/2011 | Chen et al. | 345/173 |
| 2012/0047442 A1* | 2/2012 | Nicolaou et al. | 715/738 |
| 2013/0042191 A1* | 2/2013 | Kim et al. | 715/765 |
| 2013/0167065 A1* | 6/2013 | Chen | G06F 3/0488 715/777 |
| 2015/0121289 A1 | 4/2015 | Williams et al. | |

OTHER PUBLICATIONS

Gordon, Whitson, "The Best Backup for Android", posted at lifehacker.com, Sep. 15, 2011, [site visited Jan. 14, 2016]. Available from Internet: <http://lifehacker.com/5840664/the-best-backup-app-for-android>.

"Bookmark Sort & Backup", posted at play.google.com, Sep. 17, 2012, [site visited Jan. 14, 2016]. Available from Internet: <https://play.google.com/store/apps/details?id=com.happydroid.bookmarks>.

Sirianni, Joe, "App Backup & Restore Available For Download In The Android Market", posted at talkandroid.com, Jun. 23, 2011, [site visited Jan. 14, 2016]. Available from Internet: <http://www.talkandroid.com/44075-app-backup-restore-available-for-download-in-the-android-market>.

Velazco, Chris; "The Doro PhoneEasy 740: Finally, An Android Phone for Your Grandparents"; Mobile World Congress 2012 (Feb. 27-Mar. 1, 2012); all pages; Retrieved on Jul. 12, 2016 from http://techcrunch.com/2012/02/29/the-doro-phoneeasy-740-finally-an-android-phone-for-your-grandparents/.

Nickycho; "Log Call Location", posted at play.google.com, Jul. 12, 2011; available from Internet: <https://play.google.com/store/apps/details?id=tw.nicky.LogCallLocation>.

"Quick_Start, Getting Started"; posted at code.google.com, Oct. 25, 2011; Retrieved on Jul. 13, 2016 from <https://code.google.com/archive/p/imsdroid/wikis/Quick_Start.wiki >.

"Backup Everything", posted at androidfreeware.net, Dec. 16, 2010; available from Internet: <http://www.androidfreeware.net/download-backup-everything.html>.

* cited by examiner

USER INTERFACE FOR PORTABLE DEVICE

BACKGROUND OF THE INVENTION

Portable electronic devices have become increasingly popular. One example of a portable electronic device is the so-called "smartphone" which, in addition to functioning as a cellular telephone, can execute application programs for performing a wide variety of functions, including text messaging, electronic mail messaging, taking and sharing digital photographs and video, accessing the World Wide Web via the Internet, and other functions. As the capabilities of smartphones grow, it becomes ever more challenging to present a user interface on the smartphone that enables a user to quickly and conveniently access the desired capabilities of the device.

BRIEF SUMMARY OF THE INVENTION

According to one aspect, a user interface for a portable device comprises a first screen presented on a touchscreen display, the first screen presenting selections for launching applications executable by the portable device. The selections are presented in a plurality of horizontal screen regions, and each of the plurality of horizontal screen regions includes a textual description of the respective application and an icon representing the respective application. Each application is launched by actuating its corresponding horizontal screen region. The user interface further comprises a second screen presenting selections related to respective stored contacts, the selections being presented in a plurality of horizontal screen regions. Each of the first and second screens includes a respective tab visible from both the first and second screens, and either the first or second screen is brought to the forefront by actuating its respective tab. In some embodiments, each textual application description is shown in text that is at least 30 percent as tall as its associated icon. In some embodiments, each textual application description is larger in at least one dimension than its associated icon. In some embodiments, the first screen presents a limited number of applications, and further presents a selection for accessing an alternate screen that presents selections for launching additional applications that are installed on the portable device but not shown on the first screen. The selections on the alternate screen for launching the additional applications installed on the portable device may be presented in a scrollable plurality of horizontal screen regions, wherein each screen region includes a textual description of the respective application and an icon representing the respective application, and wherein each application is launched by actuating its corresponding horizontal screen region. In some embodiments, the first screen presents a selection for launching a telephone application, and the first screen further presents a selection for launching a voicemail application that accesses voice messages associated with a telephone number of the portable device, and the selection for launching the telephone application and the selection for launching the voicemail application are presented adjacently. In some embodiments, the selection for launching the telephone application and the selection for launching the voicemail application are presented on the same horizontal screen region. In some embodiments, the user interface further comprises a plurality of individual contact screens corresponding respectively to the stored contacts listed on the second screen, and each individual contact screen is accessed by actuating the horizontal screen region of the second screen corresponding to the respective stored contact. At least one of the plurality of individual contact screens may display a chronological listing of communications with the respective stored contact. In some embodiments, at least one chronological listing of interactions includes communications encompassing multiple communication methods. Each individual contact screen may present one or more selections for directly contacting the respective stored contact. In some embodiments, the user interface further comprises a service provider support screen and a selection for reaching the service provider support screen. The selection for reaching the service provider support screen may appear on both the first and second screens.

According to another aspect, a portable electronic device comprises a touchscreen display and a processor system. The processor system is configured to present a user interface on the touchscreen display. The user interface includes a first screen, the first screen presenting selections for launching applications executable by the portable device. The selections are presented in a plurality of horizontal screen regions, and each of the plurality of screen regions includes a textual description of the respective application and an icon representing the respective application. Each respective application is launched by actuating its corresponding horizontal screen region. The user interface further includes a second screen presenting selections related to respective stored contacts, the selections being presented in a plurality of horizontal screen regions. Each of the first and second screens includes a respective tab visible from both the first and second screens, and either the first or second screen is brought to the forefront by actuating its respective tab. In some embodiments, the portable device includes a cellular telephone. In some embodiments, the first screen presents a selection for launching a telephone application, and the first screen further presents a selection for launching a voicemail application that accesses voice messages associated with a telephone number of the portable device, and the selection for launching the telephone application and the selection for launching the voicemail application are presented adjacently. The selection for launching the telephone application and the selection for launching the voicemail application may be presented on the same horizontal screen region. In some embodiments, the selection for launching the telephone application and the selection for launching the voicemail application maintain their adjacency when selections for launching applications on the portable electronic device are reorganized. In some embodiments, the first screen presents a limited number of applications, and further presents a selection for accessing an alternate screen that presents selections for launching additional applications that are installed on the portable device but not shown on the first screen.

According to another aspect, a user interface for a portable electronic device comprises a selection for launching a telephone application of the portable device, and a selection for launching a voicemail application that accesses voice messages associated with a telephone number of the portable device. The selection for launching the telephone application and the selection for launching the voicemail application are presented adjacently on the same screen. In some embodiments, the selection for launching the telephone application and the selection for launching the voicemail application maintain their adjacency when selections for launching applications on the portable electronic device are reorganized.

According to another aspect, a user interface for a portable electronic device comprises a first screen presenting selections related to respective stored contacts, the selections being presented in a plurality of horizontal screen regions. The user interface further comprises a plurality of individual contact screens corresponding respectively to the stored contacts listed on the second screen. Each of the plurality of individual contact screens is accessed by actuating the horizontal screen region of the first screen corresponding to the respective stored contact. At least one of the plurality of individual contact screens displays a chronological listing of communications with the respective stored contact. At least one chronological listing of interactions may include communications encompassing multiple communication methods. In some embodiments, each individual contact screen presents one or more selections for directly contacting the respective stored contact.

DETAILED DESCRIPTION OF THE INVENTION

Research has shown that certain customers are unsatisfied with traditional user interfaces on smartphones and other portable electronic devices. The typical user interface presents a large number of touchable icons on a touchscreen display, and the user can perform functions by touching the areas where the icons are shown. For example, a user may launch a particular application by touching on an icon that represents that application. The icons are typically small in order to present as many as feasible on the display, and may or may not include a textual title or other description of the application. If text is included, it is typically very small. When a large number of icons are shown simultaneously, there is an increased probability that some icons may be similar in color and shape to other icons, and therefore may be easily confused. If present at all, any text accompanying the icons may be so small as to be difficult to read, and therefore may not help in distinguishing between similar icons.

Figure 1:
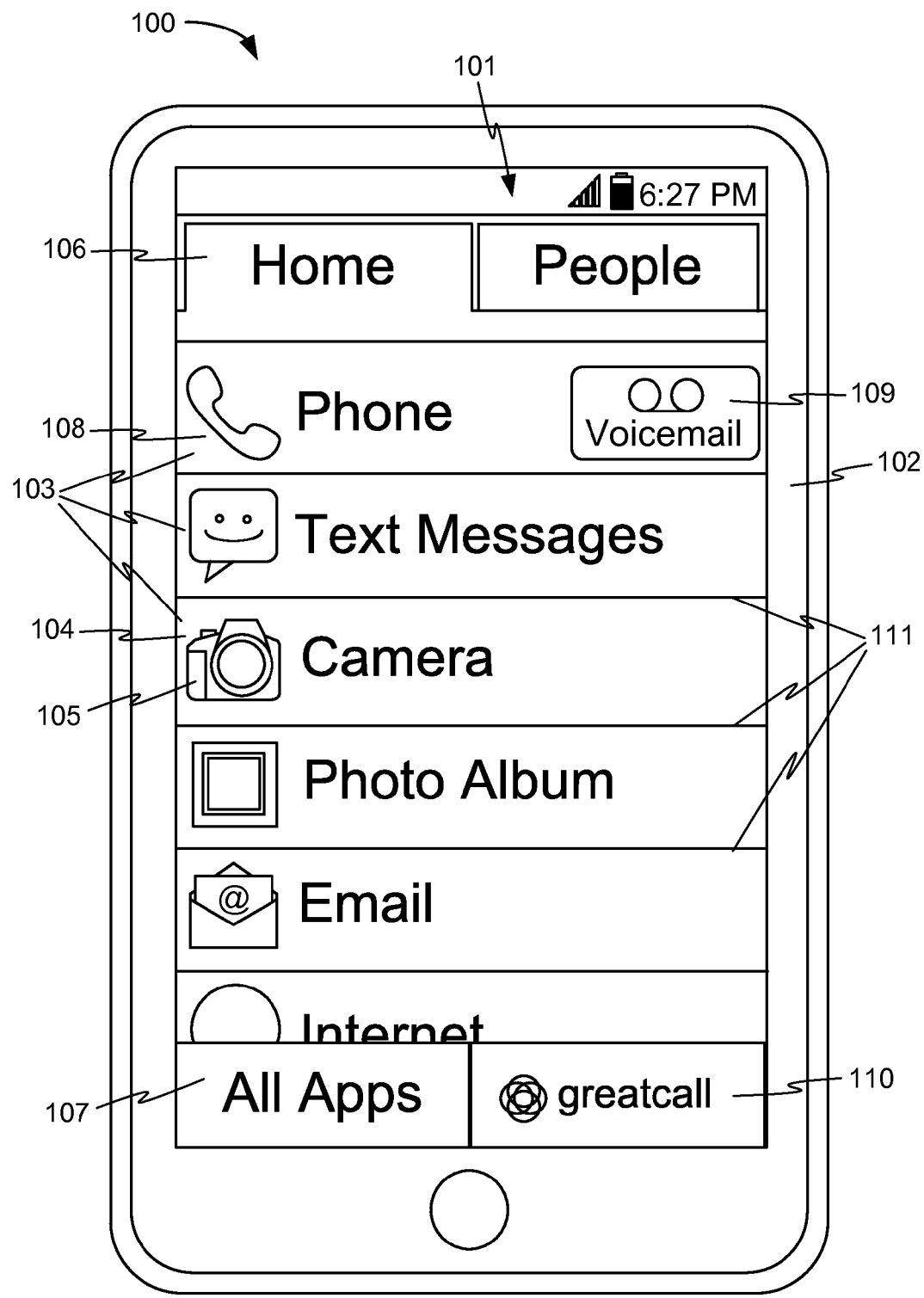
FIG. 1 illustrates a front view of a smartphone showing a first screen of a user interface in accordance with an embodiment of the invention.

FIG. 1 illustrates a front view of a smartphone 100 showing a first screen 101 of a user interface in accordance with an embodiment of the invention. Smartphone 100 includes a touchscreen display 102. Touchscreen display 102 may include, for example, a liquid crystal display overlaid with a clear, touch-sensitive structure. A processor in smartphone 100 may interpret outputs of the touch-sensitive structure to recognize when and where the surface of touchscreen display 102 is touched by the user. The system may be able to recognize multiple simultaneous touches in different parts of the display, and to recognize gestures created by dragging one or more fingers across the display in prescribed paths. The user may use such gestures to direct smartphone 100 to scroll a list of displayed items, enlarge part of the display to "zoom in" on an a portion of the displayed content, or for other purposes.

First screen 101 presents selections for launching applications that have been installed on smartphone 100. The selections are presented in a plurality of horizontal screen regions 103 (only some of which are labeled), stacked vertically so that the selections appear in the format of a list. The horizontal screen regions may be demarked by contrasting lines such as lines 111 (only some of which are labeled). Preferably, each application is launched by actuating its corresponding horizontal screen region.

For the purposes of this disclosure, a "selection" is any user interface control or feature usable to cause the portable electronic device to take an action. Examples of selections include active screen regions, virtual buttons or sliders, virtual tabs, active text, and other features.

For the purposes of this disclosure, "actuating" a screen region means touching the screen region in a way that causes a desired action to occur. For example, smartphone 100 may be programmed to use as an actuation a single touch, multiple touches in sequence, a gesture, or some other method. In many embodiments, a single touch of a screen region will serve as an actuation.

Preferably, only a limited number of selections are presented in first screen 101, for example a maximum of 3, 4, 5, 6, 7, 8, 9, or 10 selections. The order of the displayed selections may be fixed or configurable. If more selections are permitted than will fit on the display, the selections may be scrollable, for example by swiping a finger in a vertical direction on touchscreen display 102.

When more applications are installed on smartphone 100 than will fit on first screen 101, the limited number of applications to be presented on first screen 101 may be chosen in any convenient way. For example, the user may manually decide which applications should appear on first screen 101. In other embodiments, smartphone 100 may automatically present the most recently used applications or the most frequently used applications on first screen 101. Other ways of choosing the applications to display on first screen 101 may be used as well.

In the embodiment of FIG. 1, each selection includes an icon representing the corresponding application, and also includes a textual title or other description of the application. For example, selection 104 includes the textual description "Camera" and shows an icon 105 that evokes a camera.

In each case, the textual description of the application may be shown prominently with respect to its corresponding icon. For example, text of a sufficient size may be used such that the textual description is larger in at least one dimension than its corresponding icon. In FIG. 1, the word "Camera" is wider than the corresponding camera icon. In addition, the text may be relatively tall with respect to the icon, for example at least 25%, 30%, 35%, 40%, 50%, 60%, or 75% as tall as the corresponding icon, as measured by the tallest character in the text. Thus, a user of smartphone 100 who prefers to rely primarily on the textual description of an application rather than an icon can readily see the text.

First screen 101 also includes a tab 106, the function of which is explained in more detail below.

Figure 2:
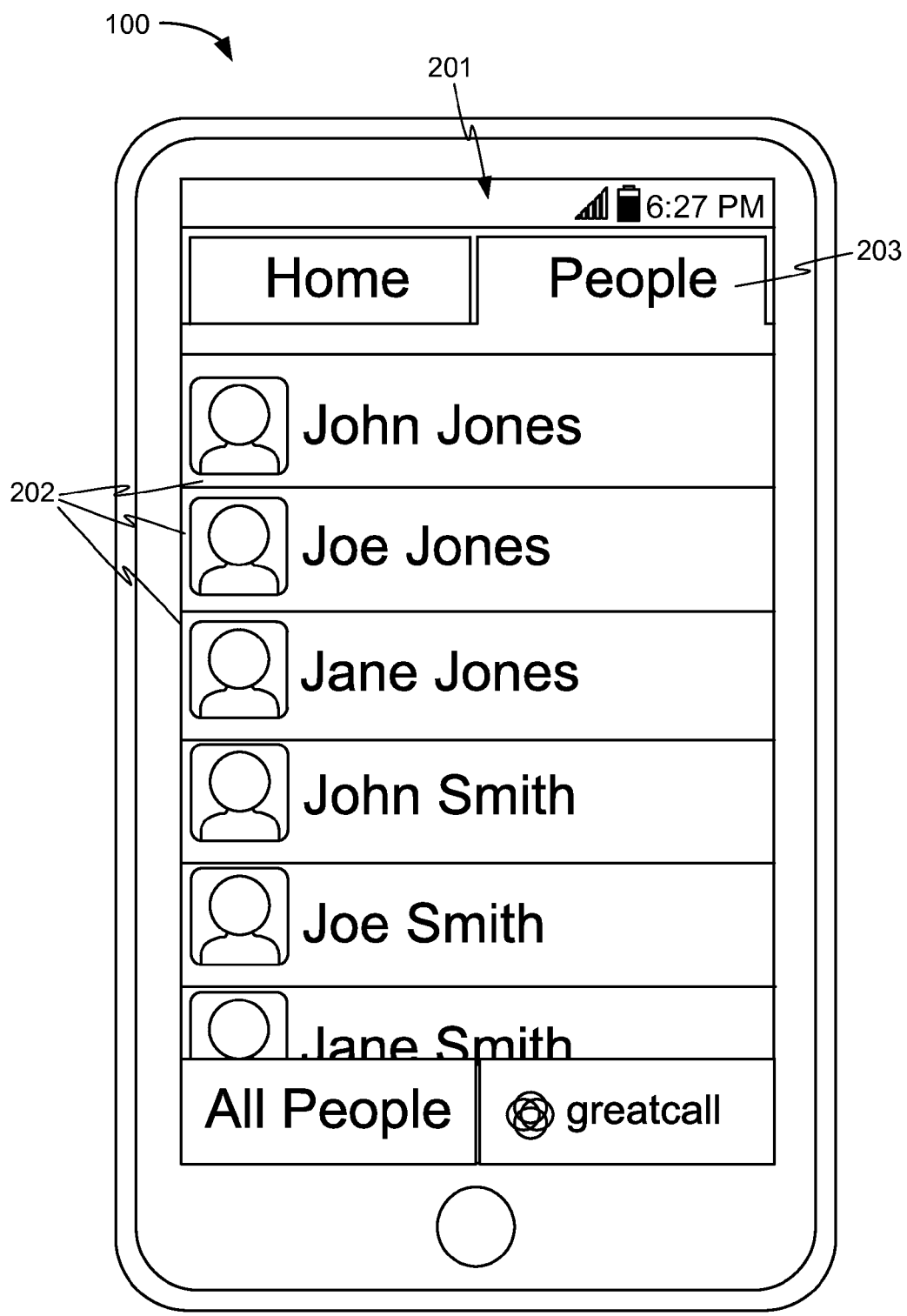
FIG. 2 illustrates a front view of a smartphone showing a second screen of the user interface of FIG. 1.

FIG. 2 illustrates a front view of a smartphone 100 showing a second screen 201 of the user interface of FIG. 1. Screen 201 presents selections relating to a number of stored contacts, for example people with which the user of smartphone 100 has communicated with or wishes to communicate with. These selections are also presented in a plurality of horizontal screen regions 202 (only some of which are labeled), stacked vertically so that these selections also appear in the format of a list. Design principles are used similar to those described above with respect to first screen 101. That is, the contact names are presented in text that is prominent in relation to any icons or photos of the contacts. For example, the text used to render the names may be at least 25%, 30%, 35%, 40%, 50%, 60%, or 75% as tall as the corresponding icons.

Preferably, screen 201 presents a limited number of selections for individual contacts, for example a maximum of 3, 4, 5, 6, 7, 8, 9, or 10 selections.

Screen 201 also includes a tab 203, similar to tab 106. Both tabs 106 and 203 are visible whichever screen 101 or 201 is in the forefront of the display. Either first screen 101 or second screen 201 is brought to the forefront by actuating its respective tab. In this way, the user can quickly and conveniently switch between first screen 101 and second screen 201.

Figure 3:
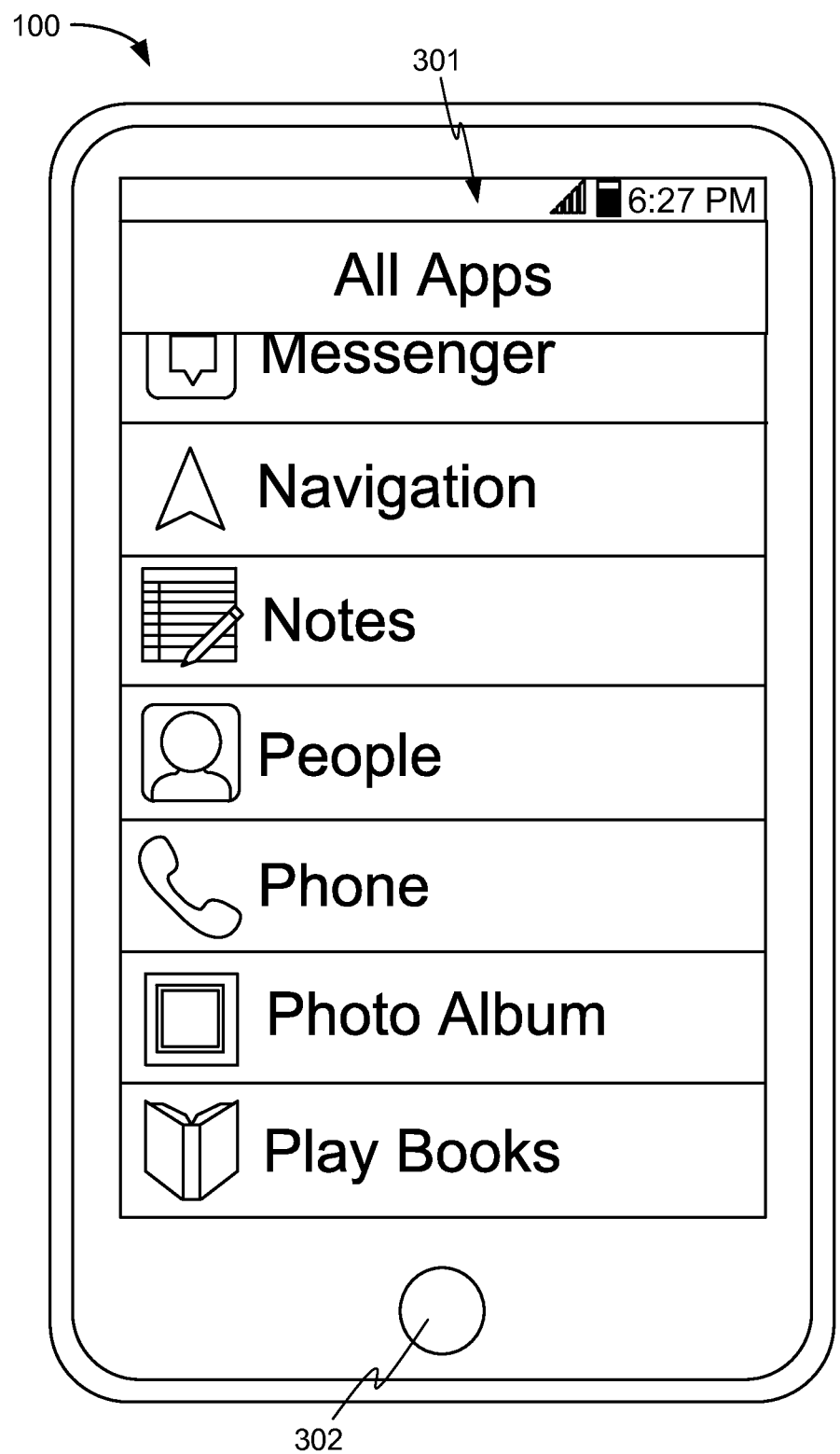
FIG. 3 illustrates a front view of a smartphone showing an alternate screen in accordance with an example embodiment.

Referring again to FIG. 1, first screen 101 may also include a selection 107 for accessing an alternate screen that presents selections for launching additional applications installed on the portable device but not shown on first screen 101. An example of such an alternate screen is screen 301, shown in FIG. 3. In some embodiments, selection 107 and alternate screen 301 may only exist if more applications are installed on smartphone 100 than will fit on first screen 101. An alternate screen such as alternate screen 301 may list the applications shown on first screen 101 as well as additional applications not shown on first screen 101.

Alternate screen 301 preferably uses design principles similar to those described above. That is, the selections on alternate screen 301 may be presented in a set of horizontal screen regions in a list format, and each application is launched by actuating its corresponding horizontal screen region. Each selection may include an icon and a textual description of the corresponding application, relatively sized as described above with respect to first screen 101. If more applications are installed on smartphone 100 than will fit on a single display, screen 301 is preferably scrollable, for example by executing a vertical swiping gesture on touchscreen display 102. A "Home" button 302 provided on smartphone 100 may be used to return to first screen 101.

Referring again to FIG. 1, one of the applications installed on example smartphone 100 is a telephone application for utilizing the telephone capability of smartphone 100. In the example of FIG. 1, the telephone application is accessed via selection 108. For example, the telephone application may present a virtual keypad on touchscreen display 102 to allow the user to "dial" telephone numbers. In addition, the user may subscribe to a voicemail service. A voicemail service allows callers to leave messages for the user when an incoming call to smartphone 100 is not answered, and may provide other services as well, such as the ability to record and send messages to other telephone numbers. The voicemail service may be provided by the user's telephone service provider, may be implemented locally on smartphone 101, or in some other manner. A voicemail application preferably enables the user to quickly and conveniently access his or her messages and other features of the voicemail service.

In some embodiments, first screen 101 further presents a selection 109 for launching a voicemail application that accesses voice messages associated with a telephone number of smartphone 100. In the embodiment of FIG. 1, selection 109 for launching the voicemail application is presented adjacent selection 108 for launching the telephone application, in the same horizontal screen region. While selections 108 and 109 are shown in FIG. 1 as being horizontally adjacent, other arrangements are possible. For example, a selection for launching a telephone application and a selection for launching a voicemail application may be vertically adjacent, on a single horizontal screen region, on separate horizontal screen regions, or in some other arrangement. Preferably, the two selections maintain their adjacency even when selections for launching applications on the portable electronic device are reorganized.

Figure 4:
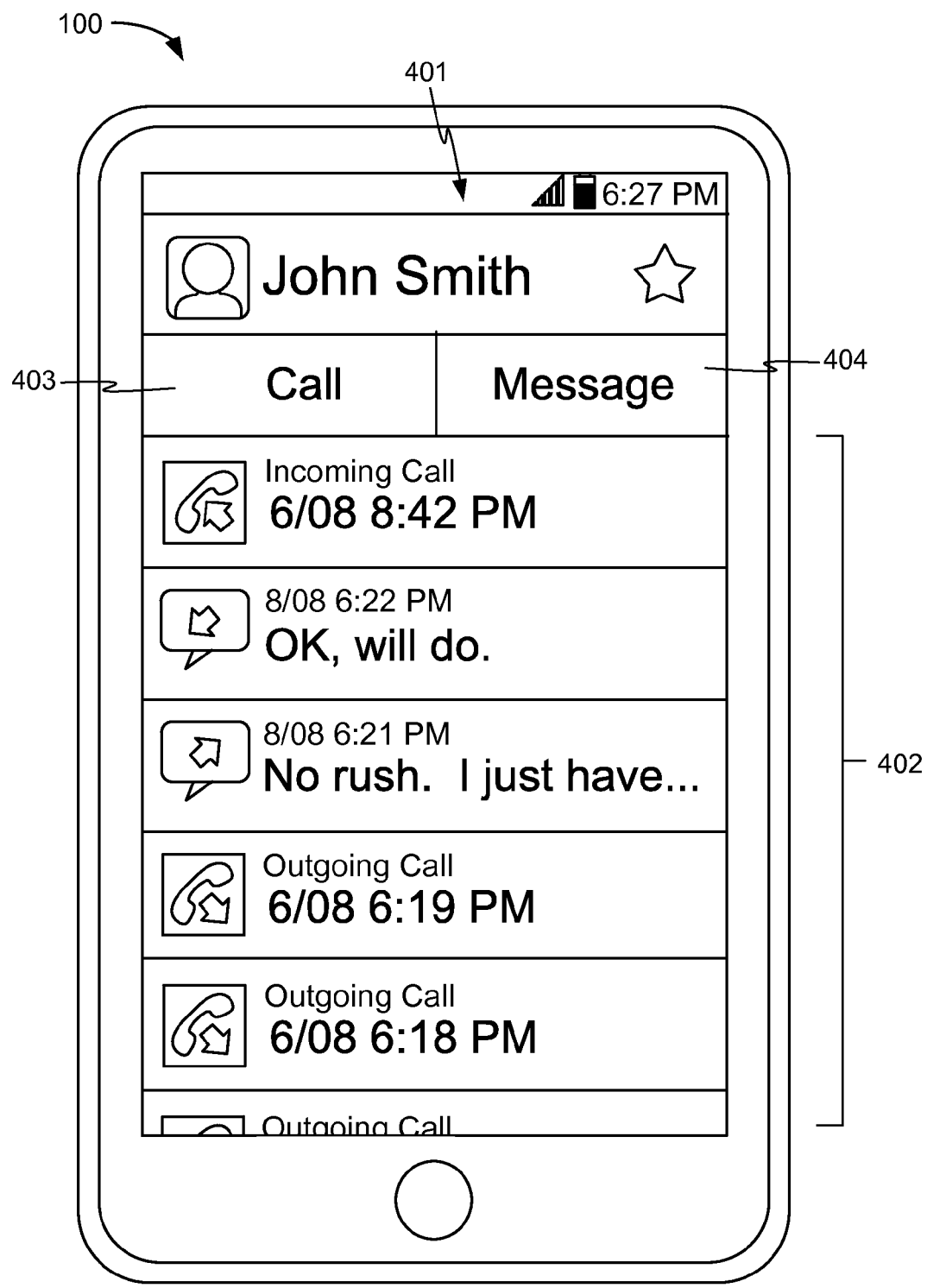
FIG. 4 illustrates a front view of a smartphone showing an individual contact screen in accordance with an embodiment.

Referring again to FIG. 2, actuating one of screen regions 202 may access an individual contact screen corresponding to the respective stored contact. An example of an individual contact screen 401 is shown in FIG. 4. Example individual contact screen 401 includes a chronological listing 402 of previous communications with the respective stored contact. Chronological listing 402 may encompass communication methods, for example showing when phone calls were placed to or received from the contact, and when text messages were sent to or received from the contact. In addition, individual contact screen 401 may present one or more selections for directly contacting the respective stored contact. For example, a telephone call may be placed to the contact by actuating a "Call" selection 403, and a text message to the contact may be instigated by actuating a "Message" selection 404.

Figure 5:
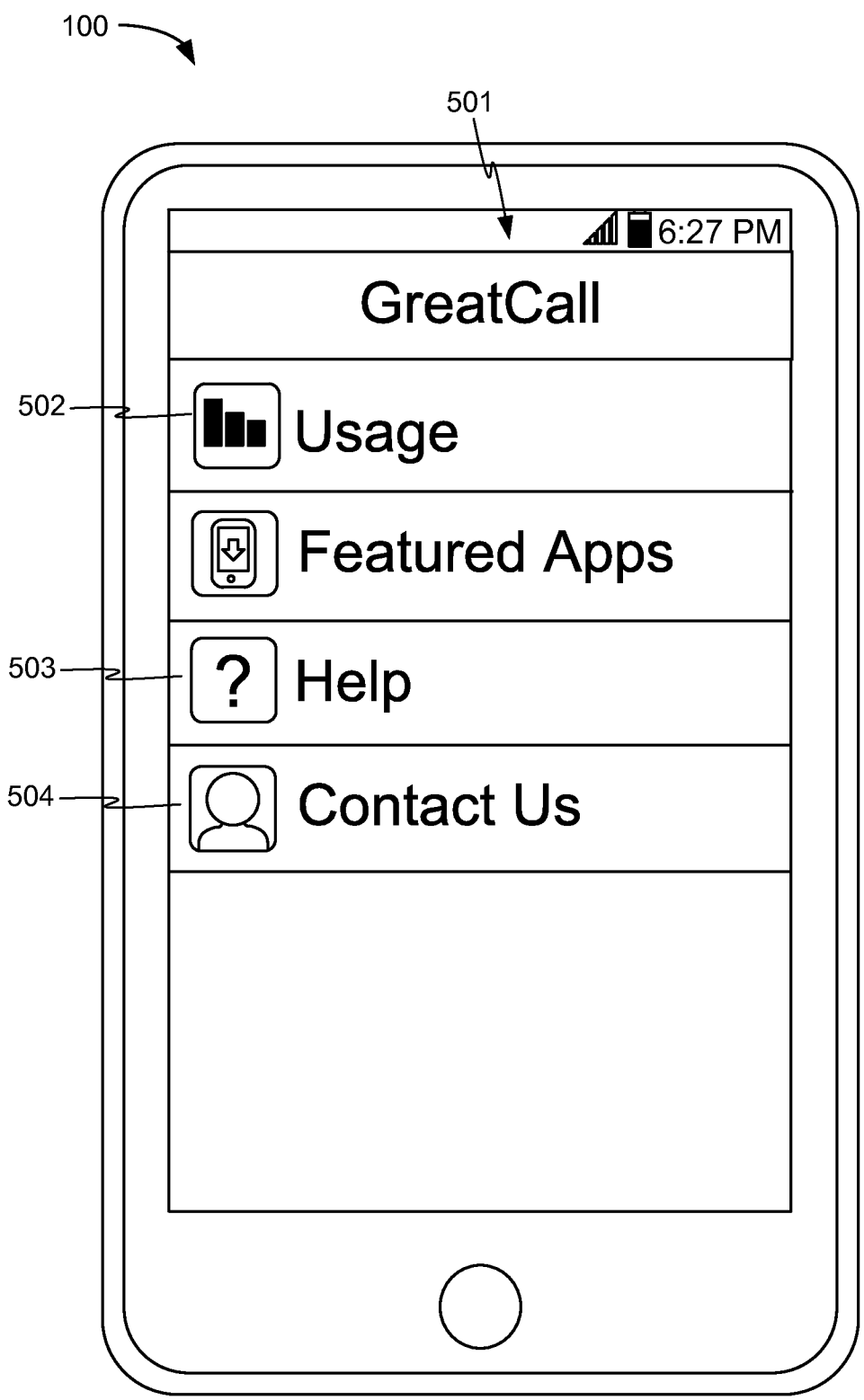
FIG. 5 illustrates a front view of a smartphone showing a service provider support screen in accordance with an embodiment.

Referring again to FIG. 1, first screen 101 may also present a selection 110 for reaching a service provider support screen. An example of a service provider support screen 501 is shown in FIG. 5. A service provider support screen such as screen 501 may enable the user to perform tasks or gain information related to the user's relationship with his or her telephone service provider. For example, example service provide support screen 501 includes a selection 502 for monitoring the user's airtime usage, a selection 503 for obtaining online assistance with the use of smartphone 100, and a selection 504 for contacting the service provider for administrative issues or technical support, among other selections. Service provider support screen 501 preferably employs similar design principles as the other screens described above.

Selection 110 may appear on either or both first screen 101 and second screen 201, and may appear on other screens of the user interface.

Figure 6:
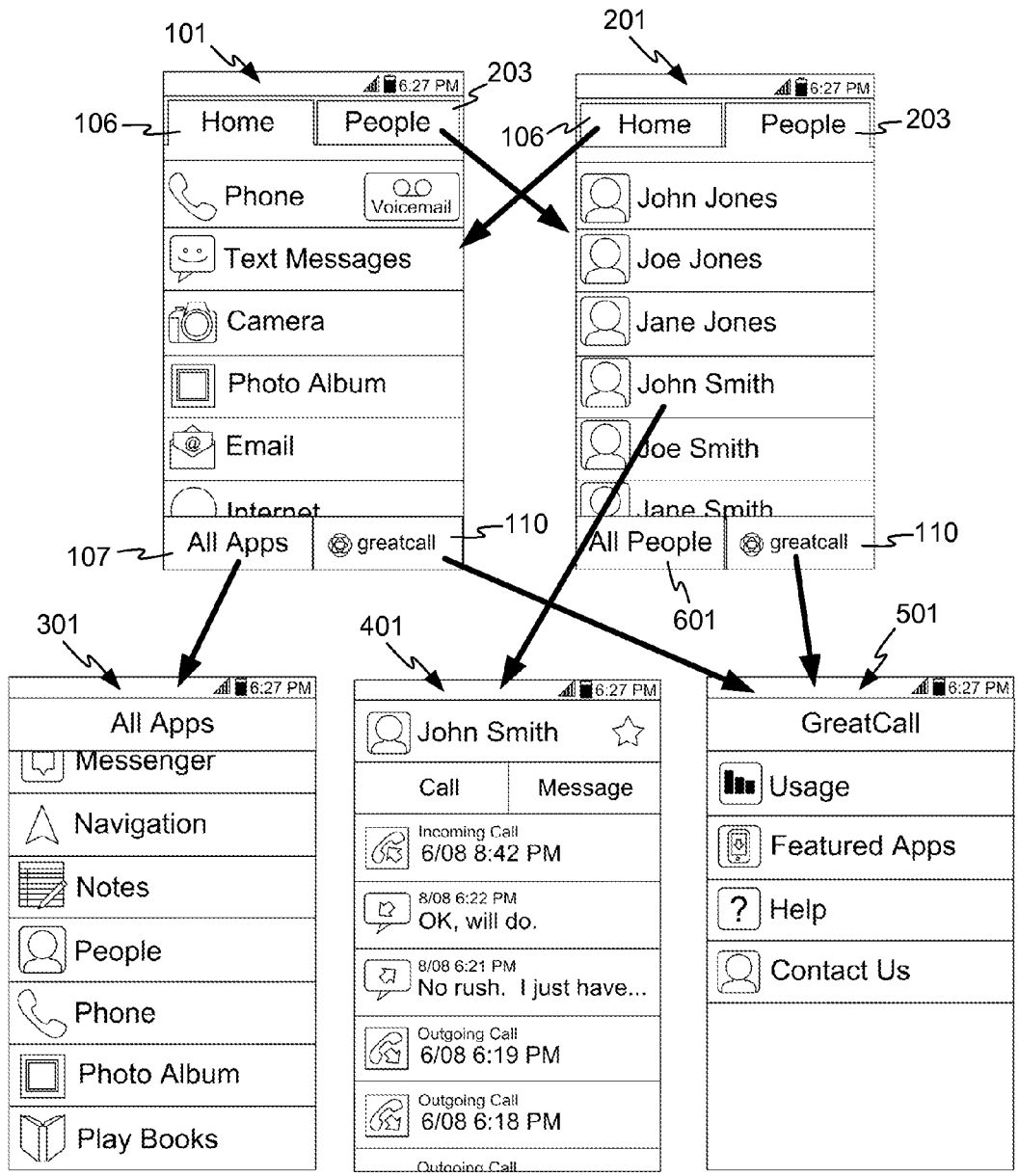
FIG. 6 illustrates the relationships of the screens of FIGS. 1-5.

FIG. 6 illustrates the relationships of screens 101-501, according to the embodiment described above. First and second screens 101 and 201 are brought to the forefront by actuating respective tabs 106 and 203 visible from both first and second screens 101 and 201. Actuating selection 107 from first screen 101 accesses alternate screen 301 that presents selections for launching all of the applications installed on the portable device. Actuating one of the selections on second screen 201 corresponding to a contact accesses individual contact screen 401 relating to the respective stored contact. Finally, actuating selection 110 accesses service provider support screen 501. A "Home" button (not shown in FIG. 6) can be used to return to first screen 101 or second screen 201.

Other screens and features not shown in FIG. 6 may be present in a user interface embodying the invention. For example, screen 102 may list a limited number of contacts, and a selection such as selection 601, may access a screen that lists additional contacts, similar to the way screen 301 lists additional applications not listed on screen 101.

Figure 7:
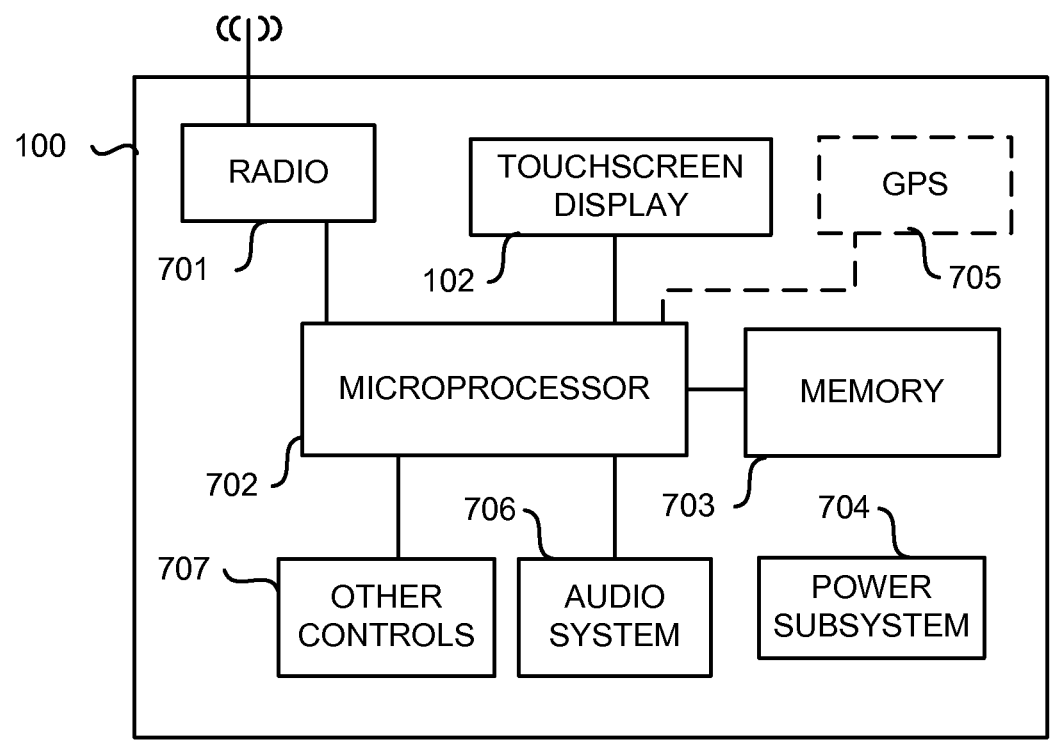
FIG. 7 illustrates a simplified block diagram of smartphone, in accordance with embodiments

FIG. 7 illustrates a simplified block diagram of smartphone 100, in accordance with embodiments. Smartphone 100 includes a radio transceiver 701 for communicating with a telephone network (not shown). Touchscreen display 102 enables visual communication of information to a user of smartphone 100, as well as user input. The operation of smartphone 100 is controlled by a microprocessor 702 executing instructions stored in a computer readable memory 703. The instructions, when executed by microprocessor 702, cause smartphone 100 to perform steps in accordance with embodiments. Computer readable memory 703 may include volatile memory, non-volatile memory, reprogrammable memory, or a combination of these. Microprocessor 702 may be any suitable kind of processor, for example a complex instruction set microprocessor, a reduced instruction set microprocessor, a digital signal processor, a microcontroller, or any other circuitry or combination of components that performs similar functions. A power subsystem 704 routes power to the other components. Optionally, a global positioning system (GPS) receiver 705 may be included, enabling smartphone 100 to accurately determine its location via GPS. In some embodiments, the power subsystem may include a battery and provision for recharging the battery. An audio system 706 may include such items as a microphone and a speaker, and may provide for audio communication with the user. Other audio functions may also be provided. Additional controls 707 may include "Home" button 302, external volume controls, and on/off switch, and the like. The depiction of smartphone 100 in FIG. 1 is simplified, and other components may be present.

While embodiments have been illustrated above in the context of a smartphone, it will be recognized that the invention may be embodied in other devices as well, for example tablet computers, personal digital assistants, and others.

While the principles of the disclosure have been described above in connection with specific apparatuses and methods, it is to be clearly understood that this description is made only by way of example and not as limitation on the scope of the disclosure.

What is claimed is:

1. A user interface for a portable device, the user interface comprising:
a vertical first list presented on a touchscreen display, the vertical first list including selections for launching applications executable by the portable device, the selections being presented in a plurality of horizontal screen regions, wherein each of the plurality of horizontal screen regions includes a textual description of the respective application and an icon representing the respective application, and wherein each application is launched by actuating its corresponding horizontal screen region, wherein the vertical first list presents a limited number of applications;
a vertical second list presenting selections related to respective stored contacts, the selections being presented in a plurality of horizontal screen regions; and
a vertical alternate list that presents selections for launching additional applications that are installed on the portable device but not shown in the vertical first list;
wherein each of the vertical first and vertical second lists includes a respective tab visible from both the vertical first and vertical second lists, and wherein either the vertical first or vertical second list is brought to the forefront by actuating its respective tab;
and wherein the vertical alternate list is accessed by actuating a selection presented with the vertical first list for accessing the vertical alternate list;
and wherein the vertical first list is scrollable and the selection for accessing the vertical alternate list is independent of the vertical first list and is presented in a fixed location on a screen that displays the vertical first list.

2. The user interface of claim 1, wherein each textual application description is shown in text that is at least 30 percent as tall as its associated icon.

3. The user interface of claim 2, wherein each textual application description is larger in at least one dimension than its associated icon.

4. The user interface of claim 1, wherein the selections in the vertical alternate list for launching the additional applications installed on the portable device are presented in a scrollable plurality of horizontal screen regions, wherein each screen region includes a textual description of the respective application and an icon representing the respective application, and wherein each application is launched by actuating its corresponding horizontal screen region.

5. The user interface of claim 1, wherein the vertical first list presents a selection for launching a telephone application, and wherein the vertical first list further presents a selection for launching a voicemail application that accesses voice messages associated with a telephone number of the portable device, and wherein the selection for launching the telephone application and the selection for launching the voicemail application are presented simultaneously and adjacently on a screen that is brought to the forefront of the user interface when a home button of the portable device is actuated.

6. The user interface of claim 5, wherein the selection for launching the telephone application and the selection for launching the voicemail application are presented on the same horizontal screen region.

7. The user interface of claim 1, further comprising a plurality of individual contact screens corresponding respectively to the stored contacts listed in the vertical second list, wherein each individual contact screen is accessed by actuating the horizontal screen region of the vertical second list corresponding to the respective stored contact.

8. The user interface of claim 7, wherein at least one of the plurality of individual contact screens displays a chronological listing of communications with the respective stored contact.

9. The user interface of claim 8, wherein at least one chronological listing of interactions includes communications encompassing multiple communication methods.

10. The user interface of claim 7, wherein each individual contact screen presents one or more selections for directly contacting the respective stored contact.

11. The user interface of claim 1, further comprising a service provider support screen and a selection for reaching the service provider support screen.

12. The user interface of claim 11, wherein the screen on which the vertical first list is displayed is a first screen, and the vertical second list is presented on a second screen, and wherein the selection for reaching the service provider support screen appears on both the first and second screens.

13. The user interface of claim 1, wherein the vertical first list presents a selection for launching a telephone application, and wherein the vertical first list further presents a selection for launching a voicemail application that accesses voice messages associated with a telephone number of the portable device, and wherein the selection for launching the telephone application and the selection for launching the voicemail application are presented simultaneously and adjacently on the same particular one of the plurality of horizontal screen regions.

14. A portable electronic device, comprising:
a touchscreen display; and
a processor system, the processor system configured to present a user interface on the touchscreen display, wherein the user interface includes
a vertical first list, the vertical first list presenting selections for launching applications executable by the portable device, the selections being presented in a plurality of horizontal screen regions, wherein each of the plurality of screen regions includes a textual description of the respective application and an icon representing the respective application, and wherein each respective application is launched by actuating its corresponding horizontal screen region, wherein the vertical first list presents a limited number of applications;
a vertical second list presenting selections related to respective stored contacts, the selections being presented in a plurality of horizontal screen regions; and
a vertical alternate list that presents selections for launching additional applications that are installed on the portable device but not shown in the vertical first list;
wherein each of the vertical first and vertical second lists includes a respective tab visible from both the vertical first and vertical second lists, and wherein either the vertical first or vertical second list is brought to the forefront by actuating its respective tab;
and wherein the vertical alternate list is accessed by actuating a selection presented with the vertical first list for accessing the vertical alternate list;
and wherein the vertical first list is scrollable and the selection for accessing the vertical alternate list is independent of the vertical first list and is presented in a fixed location on a screen that displays the vertical first list.

15. The portable electronic device of claim 14, wherein the portable device includes a cellular telephone.

16. The portable electronic device of claim 15, wherein the vertical first list presents a selection for launching a telephone application, and wherein the vertical first list further presents a selection for launching a voicemail application that accesses voice messages associated with a telephone number of the portable device, and wherein the selection for launching the telephone application and the selection for launching the voicemail application are presented simultaneously and adjacently on a screen that is brought to the forefront of the user interface when a home button of the portable device is actuated.

17. The portable electronic device of claim 16, wherein the selection for launching the telephone application and the selection for launching the voicemail application are presented on the same horizontal screen region.

18. The portable electronic device of claim 16, wherein the selection for launching the telephone application and the selection for launching the voicemail application maintain their adjacency when selections for launching applications on the portable electronic device are reorganized.

19. The portable electronic device of claim 14, wherein the vertical first list presents a selection for launching a telephone application, and wherein the vertical first list further presents a selection for launching a voicemail application that accesses voice messages associated with a telephone number of the portable device, and wherein the selection for launching the telephone application and the selection for launching the voicemail application are presented simultaneously and adjacently on the same particular one of the plurality of horizontal screen regions.

20. A user interface for a portable electronic device, the user interface comprising:
a vertical list including selections for launching applications executable by the portable device, the selections being presented in a plurality of horizontal screen regions, wherein each of the plurality of horizontal screen regions includes a textual description of the respective application and an icon representing the respective application, and wherein each application is launched by actuating its corresponding horizontal screen region;
wherein the vertical list presents a selection for launching a telephone application of the portable device, wherein the telephone application, when launched via the selection, displays a virtual keypad for entering telephone numbers;
and wherein the vertical list presents a selection for launching a voicemail application that accesses voice messages associated with a telephone number of the portable device, and wherein the selection for launching the telephone application and the selection for launching the voicemail application are presented simultaneously and adjacently in the same particular one of the plurality of horizontal regions on the same screen, which screen is brought to the forefront of the user interface making the selection for launching the telephone application and the selection for launching the voicemail application visible when a physical home button of the portable device is actuated, and wherein the particular horizontal region contains only the selection for launching the telephone application and the selection for launching the voicemail application;
and wherein the horizontal screen region containing the selection for launching the telephone application and the selection for launching the voicemail application is fixed in position in relation to at least one other screen region;
and wherein the horizontal screen region containing the selection for launching the telephone application and the selection for launching the voicemail application is at the top of the vertical list;
and wherein the horizontal screen region containing the selection for launching the telephone application and the selection for launching the voicemail application is the only horizontal region on the vertical list that contains more than one selection for launching applications executable by the portable device.

21. The user interface of claim 20, wherein the selection for launching the telephone application and the selection for launching the voicemail application maintain their adjacency when selections for launching applications on the portable electronic device are reorganized.

22. A user interface for a portable device, the user interface comprising:
a vertical first list presented on a touchscreen display, the vertical first list including selections for launching applications executable by the portable device, the selections being presented in a plurality of horizontal screen regions, wherein each of the plurality of horizontal screen regions includes a textual description of the respective application and an icon representing the respective application, and wherein each application is launched by actuating its corresponding horizontal screen region, wherein the vertical first list presents a limited number of applications;

a vertical second list presenting selections related to respective stored contacts, the selections being presented in a plurality of horizontal screen regions; and a vertical alternate list that presents selections for launching additional applications that are installed on the portable device but not shown in the vertical first list;

wherein the vertical first list includes a horizontal region containing a selection for launching a telephone application and a selection for launching a voicemail application, wherein the selection for launching the telephone application and the selection for launching the voicemail application are presented simultaneously and adjacently on the same screen;

and wherein the horizontal screen region containing the selection for launching the telephone application and the selection for launching the voicemail application is at the top of the vertical list;

and wherein the horizontal screen region containing the selection for launching the telephone application and the selection for launching the voicemail application is the only horizontal region on the first vertical list that contains more than one selection for launching applications executable by the portable device.

* * * * *